United States Patent
Cao et al.

(10) Patent No.: US 6,446,004 B1
(45) Date of Patent: Sep. 3, 2002

(54) SYSTEM AND METHOD FOR IMPLEMENTING PROXIMITY OR LOCATION DRIVEN ACTIVITIES

(75) Inventors: Kevin Trung Cao, Hamburg (DE); Daniel Alexander Ford, Los Gatos; Reiner Kraft, Gilroy, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/796,864

(22) Filed: Feb. 28, 2001

(51) Int. Cl.⁷ .............................................. G01C 21/00
(52) U.S. Cl. ...................... 701/213; 701/211; 340/995
(58) Field of Search ................................. 701/211, 213, 701/300; 342/357, 457; 340/995, 996

(56) References Cited

U.S. PATENT DOCUMENTS

| | | | |
|---|---|---|---|
| 5,444,444 A | 8/1995 | Ross | 340/994 |
| 5,470,233 A | 11/1995 | Fruchterman et al. | 434/112 |
| 5,570,100 A * | 10/1996 | Grube et al. | 701/204 |
| 5,699,244 A * | 12/1997 | Clark et al. | 702/2 |
| 5,732,074 A * | 3/1998 | Spaur et al. | 370/313 |
| 5,790,974 A | 8/1998 | Tognazzini | 455/456 |
| 5,808,565 A | 9/1998 | Matta et al. | 340/994 |
| 5,938,721 A | 8/1999 | Dussell et al. | 701/211 |

OTHER PUBLICATIONS

G.D. Abowd et al. "Cyberguide: A Mobile Context–Aware Tour Guide," Baltzer Journal, Sep. 23, 1996, pp. 1–21.
A.C. Huang et al., "Pervasive Computing: What Is It Good For?," copyrighted 1999, pp. 84–91.

* cited by examiner

*Primary Examiner*—William A. Cuchlinski, Jr.
*Assistant Examiner*—Marthe Y. Marc-Coleman
(74) *Attorney, Agent, or Firm*—Samuel A. Kassatly

(57) ABSTRACT

A system and associated method that allow particular requests to be executed at some point in the future without specifying the exact time or necessarily a precise location. The execution time of the request is linked to the arrival of a person or object at, or near a geographic destination location. When a person, an object, or a group of persons or objects, arrives at the destination location, or comes close to it, the request to interact will be executed. The proximity threshold can be adjustable or programmable.

33 Claims, 9 Drawing Sheets

SYSTEM AND METHOD FOR IMPLEMENTING PROXIMITY OR LOCATION DRIVEN ACTIVITIES

CROSS REFERENCE TO RELATED APPLICATION

This application relates to co-pending patent application, titled "Group Notification System and Method for Implementing and Indicating the Proximity of Individuals or Groups to Other Individuals or Groups," Ser. No. 09/797,149, filed concurrently herewith, assigned to the same assignee as the present invention, and which is incorporated herein by reference in its entirety.

FIELD OF THE INVENTION

The present invention relates to the field of location dependent data processing, and particularly to a software system and associated method for use with a Personal Digital Assistant (PDA) combined with a Global Positioning System (GPS) locator, and an integrated software suite suited to permit the implementation of proximity and/or location driven activities.

BACKGROUND OF THE INVENTION

Internet based services and derived e-commerce applications are gaining increasing popularity, leading to the integration of diverse computing and communications devices, such as mobile phones, PDAs, and GPS systems. Such integration has expanded the need for a new generation of "smart devices", independent electronic, web-oriented, software and technological systems and services. One specific need is for a system that uses proximity and/or locations as a means of facilitating the communication between a user and a computer system, such as a server.

The following publications represent attempts to integrate location positioning for various applications, and illustrate background material to help explain the context of the problem addressed by the present invention:

U.S. Pat. No. 5,444,444 to Ross et al.;

U.S. Pat. No. 5,790,974 to Tognazzini et al.;

U.S. Pat. No. 5,470,233 to Fruchterman et al.; and

U.S. Pat. No. 5,938,721 to Dussell et al.

The following example illustrates the type of problem addressed by this invention. A user would like to watch a specific movie. The date or dates he/she would like to watch this movie might be already known, chosen or specified, for example, a Saturday evening. It is not clear to this user, what is the best time or location to watch the movie. The user may choose to make reservations for the tickets.

However, the ticket may not allow flexibility with respect to the time the movie starts or the location of the movie theater. It would thus be desirable to have the user's communication device, such as a PDA, be capable of automatically purchasing the ticket from a non-specific nearby movie theater, at the moment when the user comes into sufficiently close proximity, but not earlier.

SUMMARY OF THE INVENTION

The present invention presents a system and an associated method that allow particular requests to be executed at some point in the future without specifying the exact time or necessarily a precise location. The execution time of the request is linked to the arrival of a person or object at, or near a geographic location or destination. When a person or object arrives at that location, or comes close to it, the request to interact will be executed. Moreover, a request for a binary software program results in improved functionality being added to a user's wireless PDA communication device. It enables this device to perform tasks, or display data, which it could not otherwise perform. The proximity threshold can be adjustable or programmable.

For example, the trigger could be executed when the person arrives at a movie theater or museum within a given distance range. First, an event is triggered from the client side of the invention (the person's wireless PDA communication device). A request is sent to the other interacting system (e.g. movie theater server). Depending on the request, this system will generate a transaction, or send back executable software code, or other digital content, which can be further processed on the client side.

Another feature of the present system is its ability to interact closely with a user's active calendaring system, which allows access to the user's personal profiles. This enables the system to perform predictions of a user's activities or locations, and to determine the type of event to trigger. For instance, if a meeting is scheduled for one hour prior to the start time of the desired movie, and based on the history of the meeting underway, it would be clear to that system that the current meeting will not be completed before the movie start time. As a result, the system might provide the user with some recommendations as to which movie theater will be the most convenient, based on the current user's physical location. However, the trigger criteria will still be the proximity to the desired location. Therefore, integrating the user's profiles will help make the present system smarter to adapt to a user's personal situation.

The following two examples will help clarify the features of the present system. In a first example, the user wishes to watch a specific movie, but may have other contingencies prior to the time the movie begins. For example, the user might have business meetings, or other engagements. The same movie might be showing at several movie theaters in the locality at several different start times. In this example, each movie theater represents an independent system that permits users to buy tickets for a specific performance. Once the user is ready to head to the movie theater, he or she drives towards non specific movie theaters in the vicinity close to user's present location.

In one embodiment, the user is provided with a communication device, such as a wireless personal digital assistant (PDA), that is equipped with a web-based calendaring system. The PDA calendaring system is aware of the user's desire to watch a specific movie, so that the user's physical proximity to a non-specific movie theater could trigger the purchase of the tickets after confirmation by the user.

In this example, the destination location is a "movie theater" and no exact physical location is specified except a distance threshold limit within which to activate the ticket purchase, at the moment when the user comes into sufficiently close proximity to a qualifying movie theater, but not earlier. When this event happens, the user will simply pick up the tickets (perhaps electronic "tickets" transmitted to the wireless PDA) that have been already purchased. One advantage of the present system is that it avoids the need for a user to stand in a ticket line.

The second example represents a more complex illustration of the use of the present invention. A user arrives at a museum and is equipped with a wireless PDA communication device, and he or she wishes that upon arrival, the local museum company web-based server wirelessly transmit an interactive tour guide (in digital form) to the user's communication device, or at least the museum's server request that a download be made available for purchase or rent. This would help the user to obtain navigational help to locate various points of interest.

The difference in the foregoing two-examples is that the first example represents a simple purchasing transaction, which was triggered automatically upon the user's proximity to a preprogrammed location, whereas in the second example, the unexpected or non-specific proximity event triggers the downloading of executable software and data to the user's communication device. However, in both examples, the triggering of the event to purchase, or the event to download is based upon the user's proximity to a desired destination.

The foregoing and other features of the present invention are realized by a system that includes a user mobile computing device, an active calendar module, and an event proximity server. The user mobile computing device may be, for example, a personal computer such as a laptop, or a personal digital assistant (PDA), and preferably has a wireless means of communication with the other components of the system.

The active calendar module tracks the user's present and future plans and activities, and can be part of the user mobile computing device or, alternatively, it could be a separate component. The event proximity server can be operated and maintained by various clients or by independent services with access to the destination sites.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

The following definitions and explanations provide background information pertaining to the technical field of the present invention, and are intended to facilitate the understanding of the present invention without limiting its scope:

Server: A software program or a computer that responds to requests from a web browser by returning ("serving") web documents.

Symbolic location: A virtual representation or designation of a building, a landmark, a sign, a vehicle, an airport, or otherwise a location.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

World Wide Web (WWW): An Internet client—server hypertext distributed information retrieval system.

Figure 1:
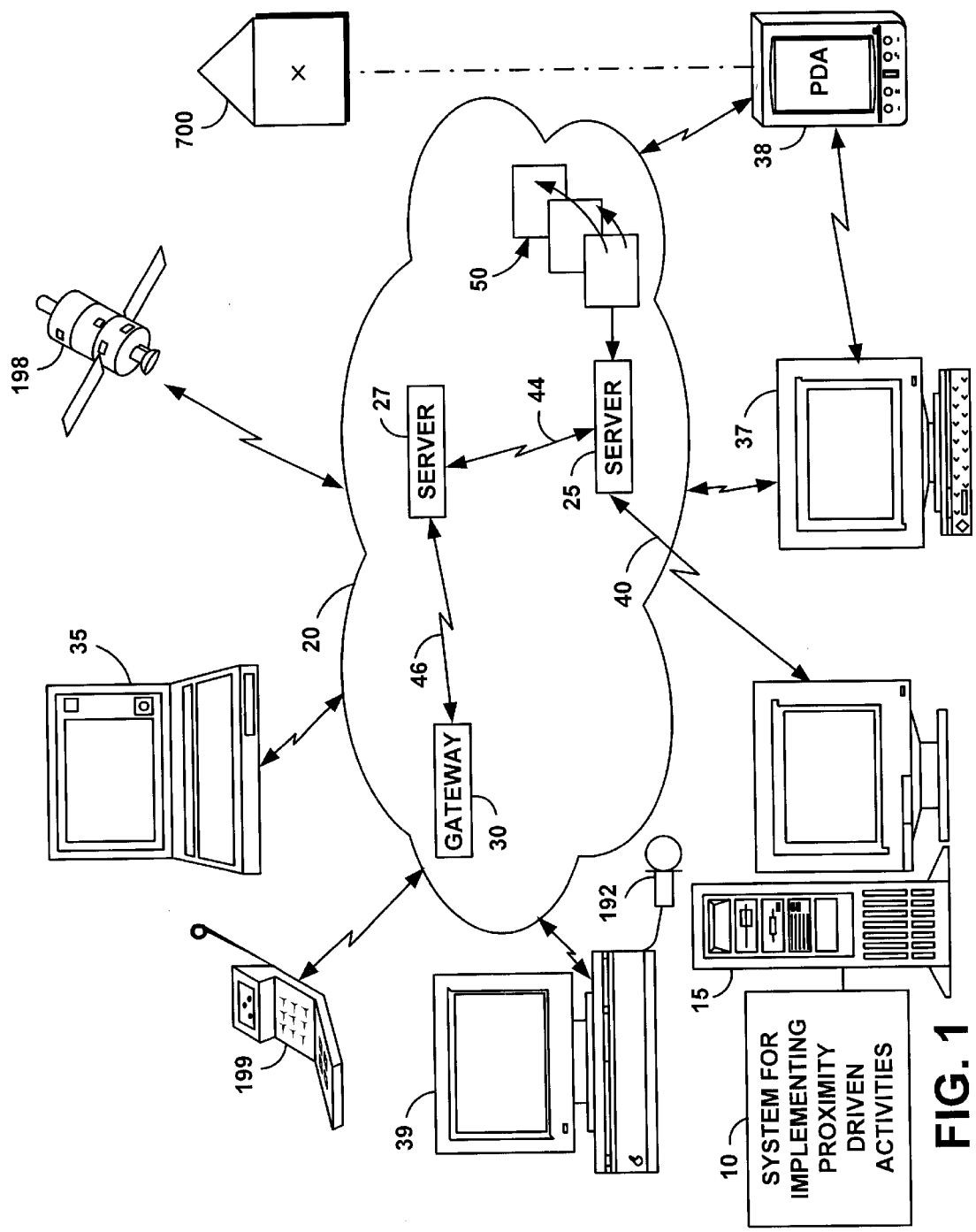
FIG. 1 is a schematic illustration of an exemplary operating environment in which a system for implementing proximity and [00af] or location driven activities according to the present invention can be used.

FIG. 1 portrays an overall environment in which a system 10 for implementing proximity and/or location driven activities according to the present invention may be used. The system 10 continuously monitors the location of users (or objects) and compares their proximity to one or more destination locations maintained by the system 10.

The system 10 includes a software or computer program product which is typically embedded within, or installed on a host server 15. Alternatively, the system 10 can be saved on a suitable storage medium such as a diskette, a CD, a hard drive, or similar devices. According to one embodiment of the present invention, the system 10 may include several host servers or gateways 25, 27, 30 that can de dispersed geographically to co-ordinate the reduction of access time from, for example, clients 35, 37, 38 and 39.

In addition, while the system 10 will be described in connection with the WWW, it can also be used with a stand-alone database of computers, servers, gateways, and mobile computing devices for applications that do not need or desire interaction with the WWW.

The cloud-like communication network 20 of FIG. 1 is comprised of communication lines and switches connecting servers such as servers 25, 27, to gateways 30. The servers 25, 27 and the gateway 30 provide the communication access to the WWW. Clients such as remote Internet sites are represented by a variety of computers 35, 37, 39, or a personal digital assistant (PDA) 38, and can query the host server 15 for the desired information. In on embodiment of the present invention, clients may also be servers, web sites, gateways, or computers located, for example, at various locations such as restaurants, libraries, museums, and so forth. The clients communicate to the servers 25, 27 the information concerning the location of the premises to be visited by the users.

For clarity purpose, it would be convenient to draw. a distinction between a user and a client. The user is the mobile user who programs his or her handheld or mobile computing device according to his or her needs. The client can be, for example, a theater owner, a restaurant owner, or a museum operator; and can be generally represented by the numeral 700 (FIG. 1), by a destination location server 310 (FIG. 2) and/or an event proximity server 400 (FIGS. 2 and 5), to be described later. The client exercises controls over the services to be provided to the user.

The host server. 15 is connected to the network 20 (represented as a cloud to indicate an indeterminate number of connections) via a communications link such as a telephone, cable satellite link, etc. The servers 25, 27 can be connected via high speed Internet network lines or links 44 and 46 to other computers and gateways. The servers 25, 27 provide access to stored information such as hypertext or web documents indicated generally at 50. The hypertext documents 50 most likely include embedded hypertext links to other locally stored pages and may also contain information on the destination locations and functions such as timetables, menus, movie selections, etc.

An auxiliary component that could be used as a mobile computing unit is represented by a mobile computing unit such as a personal digital assistant or PDA 38. The PDA 38 can be provided with a downloadable software application suited to implement the operation of the present invention. A cellular telephone 199 can also be used as a mobile computing unit for the purposes of this invention. The increasing trend to combine personal digital assistants 38 and mobile telephones 199 will facilitate the need to use satellite communications to identify the user location. A satellite 198 may be an important (though non-exclusive) part of this invention for the purposes of either assisting user location or assisting the. transmission of communication between users, clients, servers, and gateways.

Figure 2:
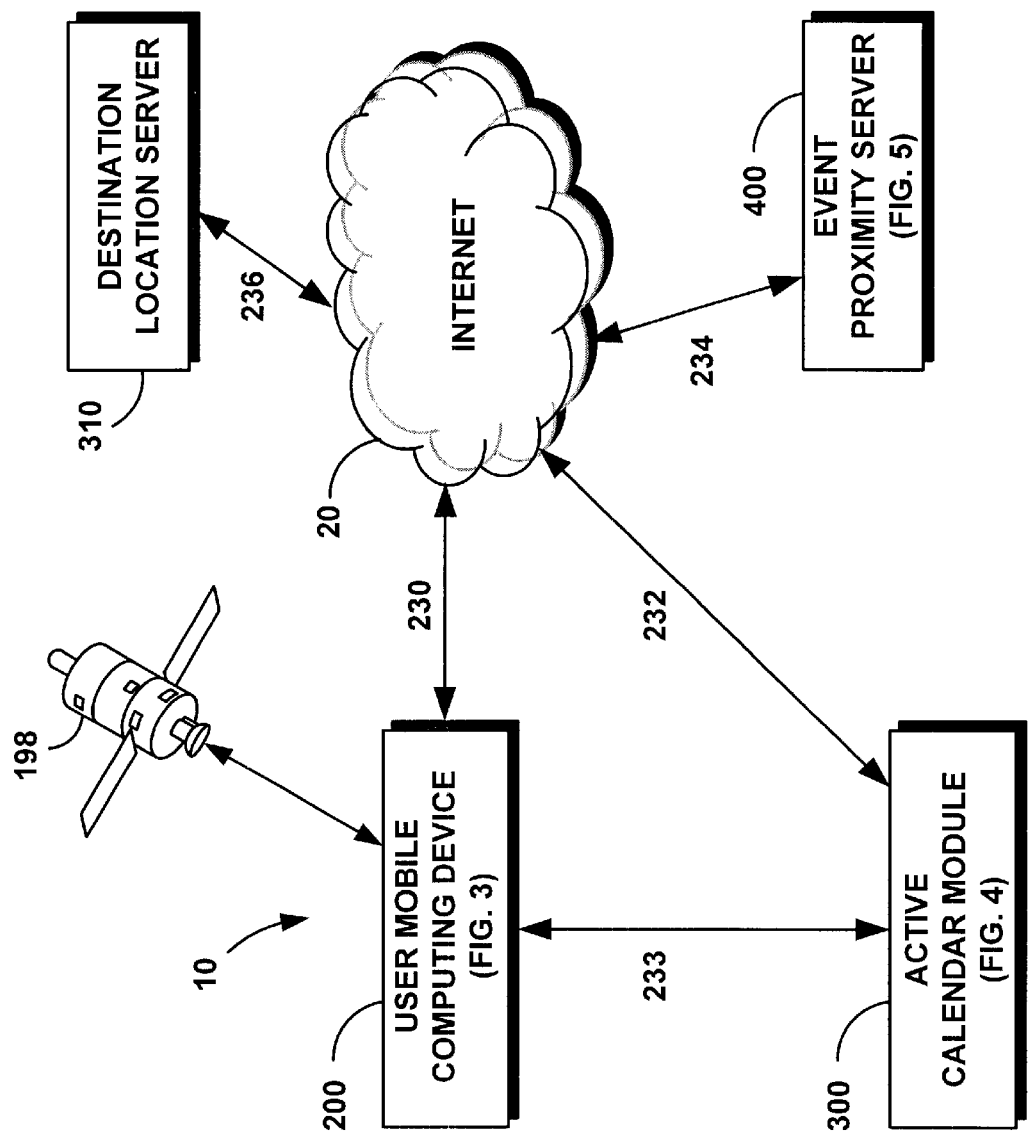
FIG. 2 is a high level diagram illustrating the main components of the system of FIG. 1.

With reference to FIG. 2, it illustrates the main components of the present invention: The first is a user mobile computing device 200, which is also referred to herein as client wireless component. The user mobile computing device 200 may be, for example, a personal computer such as a laptop, or a personal digital assistant (PDA) 38. The user mobile computing device 200 preferably has a wireless means of communication with the other components of the system 10.

The second component of the system 10 is an active calendar module 300 that tracks the user's present and future plans and activities. The active calendar module 300 can be part of the user mobile computing device 200, or, alternatively, it could be a separate component. It should be understood that the function of the active calendar module 300 can be incorporated within the user mobile computing device 200, and thus the physical component could be eliminated altogether.

The third main component of the system 10 is the destination location server 310 (FIG. 2) that interfaces with the event proximity server 400 and the user mobile computing device 200 to complete the desired transaction from one or more destination locations 700. For example, the destination location server 310 executes the user' purchase orders. The destination location server 310 can service one or more destination locations, and can be located at, or adjacent to these destination locations. Typically, the clients exercise control over the destination location server 310, the services provided thereby, and the accounting between the clients and the event proximity server 400 for the transactions conducted by, or through the event proximity server 400.

The fourth main component of the system 10 is the event proximity server 400 which is typically controlled by a third party business and located at unspecified locations. Though reference is made herein to one event proximity server 400, it should be clear that the reference numeral 400 can represent several servers under the control of a plurality of third parties that provide numerous different services. The event proximity server 400 is therefore preferably operated and maintained by various independent services with access to the destination sites, such as museums, libraries. stores, malls, auto shops, etc., the user's active calendar modules 300 and the destination location servers 310.

While the system 10 is illustrated in FIG. 2 as including a single user mobile computing device 200, a single active calendar module 300, a single-destination location server 310, and a single server 400, it should be understood that the system 10 can accommodate a plurality of these components.

Having described the main components of the system 10, they will now be described in connection with FIGS. 3 through 5.

Figure 3:
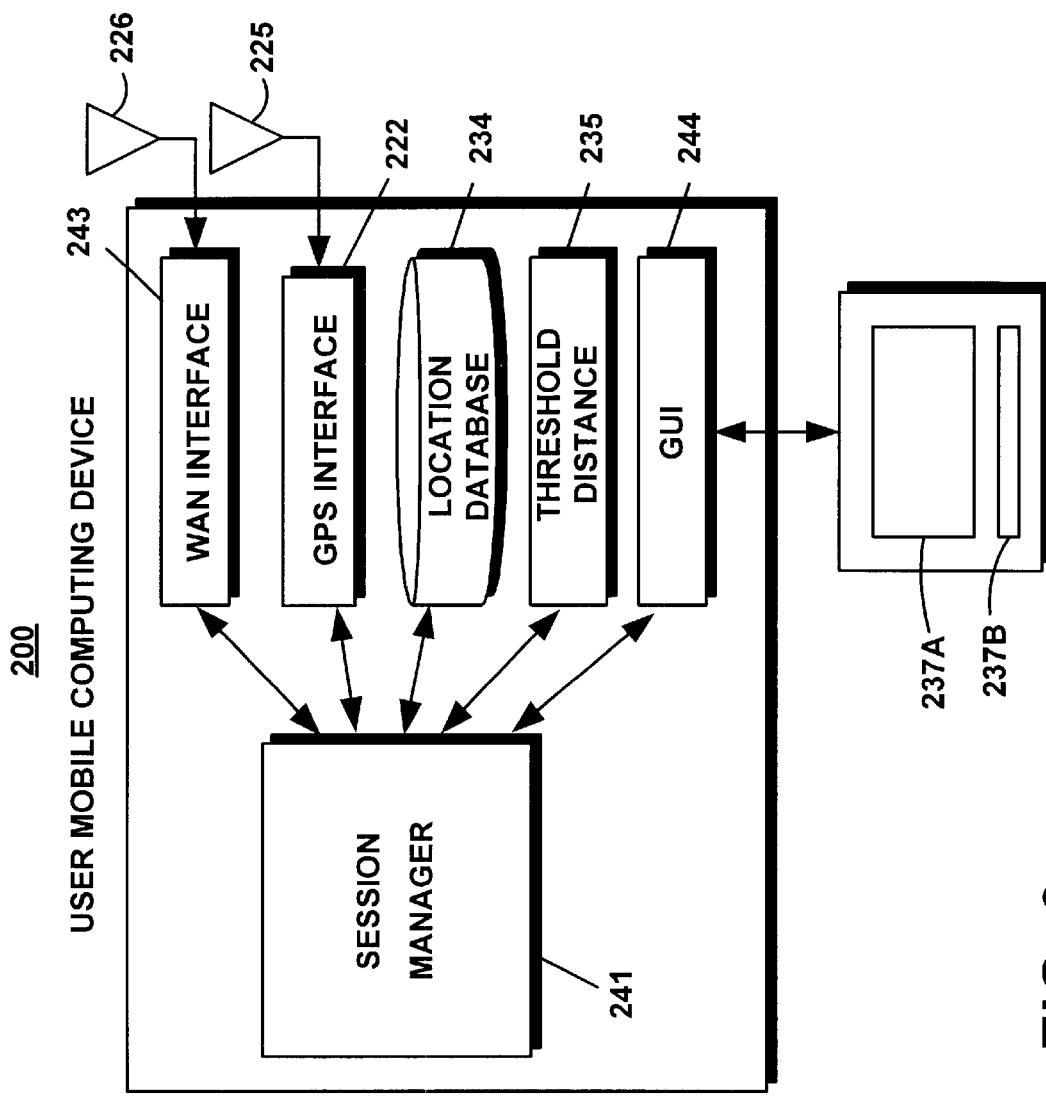
FIG. 3 is a block diagram illustrating the constituent building blocks of an exemplary user mobile computing device that forms part of the system of FIG. 2.

The User Mobile Computing Device 200 (FIGS. 2 and 3)

With reference to FIGS. 2 and 3, the user mobile computing device 200 is comprised of several sub-components, and utilizes, for example, GPS technology for location tracking. The user mobile computing device 200 may be implemented as a laptop computer, mobile phone, or a personal digital assistant (PDA), and may be provided with a wireless wide area network (WAN) connection for communicating with the active calendar module 300 and the server 400.

The user mobile computing device 200 includes a GPS interface 222 for receiving location information from the GPS satellites 198 (FIG. 1) over an antenna 225. The user mobile computing device 200 determines the location of the current user, and sends this information to the active. calendar module 300 either via the communication link 233, or via the network 20 and the communications links 230 or 232 (FIG. 2).

In addition, the user mobile computing device 200 receives data from the server 400 by means of a WAN transceiver antenna 226, and displays it to the user on a display 227A, or executes the software code on the user mobile computing device 200. The user can enter the desired event or destination location into the user mobile computing device 200 via an input device 227B, such as a touch screen, keyboard, stylus, microphone combined with voice recognition software, etc. Alternatively, the user can enter the desired event or destinatio[008e] location using the active calendar module 300, as it will be explained later.

As used herein, the destination location can be "symbolic" and/or "specific". A symbolic location is a virtual representation or designation of a building, a landmark, a sign, a vehicle, an airport, or otherwise a location.

A symbolic destination location is said to be "precise" if it refers to a precise symbolic location such as "my home" or "my office" and can be expressed by a symbolic location schema, for example: "symbolic location://1234 Charleston street/San Jose/Calif./95111/USA/". In this schema, the initial designation "symbolic location://" refers to the protocol, and the hierarchical structure separated by forward slashes"/" represents a tree starting with the root from left to the leaves on the right. A precise symbolic location can me mapped directly into one coordinate pair using a database.

A symbolic destination location is said to be "non-precise" or "generic" symbolic location such as "train station" or "AMC Movie Theater", etc., and can be expressed by a symbolic location schema, for example: "symbolic location://San Mateo/Calif./94222/USA/BART Station/". In other terms, the non precise symbolic location might map into a vector of precise coordinate pairs. For instance, "symbolic location://san jose/movie theaters/" might map into 150 different precise movie theater locations such as {"symbolic location://san jose/movie theaters/amc 20 santa clara", "", ""}, which then can be mapped into specific coordinates: "physical lat long://earth/124W/58S", etc. A non precise symbolic location tree with an external node (leaf) can be directly converted into a specific coordinate pair (e.g. "symbolic location://san jose/movie theaters/amc 20 santa clara"), where "amc 20 santa clara" represents a leaf of the tree. However, the internal nodes of the symbolic location tree, such as "symbolic location://san jose/movie theaters/" cannot be mapped directly, and needs to be converted into non-specific coordinates with leafs first.

A specific location is a precise location referenced by a standard coordinate system, such as longitude and latitude, and can be expressed, for example, by the following address schema: "Physical Lat Long://earth/1234W/128S/".

The user mobile computing device 200 combines the destination location with threshold range values and tasks (or commands) to indicate the minimum desired distance between the user mobile computing device 200 and the desired destination location, so as to permit task execution. If the user approaches the destination at a distance less than the threshold range then the task is activated (or the desired event initiated).

The user mobile computing device 200 operates under the control of a session manager 241. The session manager 241 controls the interaction between the various sub components of the user mobile computing device 200. It prepares the incoming data, such as location, calendar entries and data/software code to send either to the active calendar module 300 over, for example, a wide area network (WAN) interface 243, displays them over a graphical user interface (GUI) 244 on the screen 227A, or executes the downloaded software code on the user mobile computing device 200.

The GPS interface 222 is implemented as a miniaturized GPS receiver that measures the time a radio signal requires to travel from a GPS satellite 198 until it arrives at the GPS antenna 225. By knowing the speed of the radio signal (which is approximately the speed of light), and the time at which each signal is transmitted, the distance to each of the GPS satellites (typically three GPS satellites) can be determined by means of known techniques, for example, trigonometric equations. The final solution of these equations produces an exact position of the GPS antenna 225 in term of latitude and longitude. The GPS receiver interface 222 determines a current location of the user mobile computing device 200 and supplies the current location to the session manager 241.

The WAN interface 243 supports a wireless connection to the network 20. This WAN interface 243 enables the user mobile computing device 200 to be connected to the server 400, and, if needed, to the active calendar module 300, via the network 20.

The graphical user interface 244 (GUI) is implemented in the user mobile computing device 200 to facilitate data entry of configuration and input calendar entries. The GPS antenna 255 connects to the GPS interface 222 to receive GPS data from the GPS satellite system as represented by the GPS satellite 198.

The WAN transceiver antenna 226 is used to establish a wireless connection to the network 20. The WAN transceiver antenna 226 is connected to the WAN interface 243 of the user mobile computing device 200.

The display or output device 227A may be implemented as a display of a wireless device, and the input device 227B as a touch screen. The touch screen is used for manually activated user inputs and configuration.

In a preferred embodiment, the session manager 241 periodically measures the distance between the user's current location (i.e., the location of the user mobile computing device 200) and the destination location 700, and automatically communicates the distance information to the event proximity server 400 and/or the destination location server 310.

A location database 234 may be implemented as a repository to store temporary locations for measuring the distance between the user (i.e., the user mobile computing device 200), and the destination location 700. The following Table I represents an example of values stored in the location database 234. The records are updated periodically.

TABLE I

| # OF POSITION | LOCATION | APPLICATION | THRESHOLD |
|---|---|---|---|
| 1 | LAT 1/LONG 1 | Appl. 1 | 10 m |
| 2 | LAT 2/LONG 2 | Appl. 2 | 100 m |
| 3 | LAT 3/LONG 3 | Appl. 3 | 1 m |
| 4 | LAT 4/LONG 4 | Appl. 4 | 1 km |
| ... | ... | ... | ... |
| n-1 | LAT X/LONG X | Appl. n-1 | X m |
| n | LAT N/LONG N | Appl. n | N m |

In this Table I, the following parameters are defined as follows:

Lat 1 represents the latitude of first position (degrees);

Lat 2 represents the latitude of second position (degrees), and so forth;

Long 1 represents the longitude of the first position (degrees);

Long 2 represents the longitude of the second position (degrees), and so forth.

Appl. 1 represents the first application to be executed upon the user entry within the proximity range.

Appl. 2 represents the first application to be executed upon the user entry within the proximity range.

When the distance between the user mobile computing device 200 and a destination location 700 is less than a predetermined threshold distance (i.e., within the proximity range), the execution of a program specific to the user and to the server location is initiated. The threshold distances are stored in a threshold distance database 235 that can be physically located within the user mobile computing device 200 and/or the active calendar module 300, or in a remote server database. The threshold distance that triggers the execution of an application can be predetermined or computed dynamically from a variety of inputs, including but not limited to the specific user, object, or a group of users or objects, the user's current speed, the user's direction of travel, the time of day, and other factors such as the weather.

Figure 4:
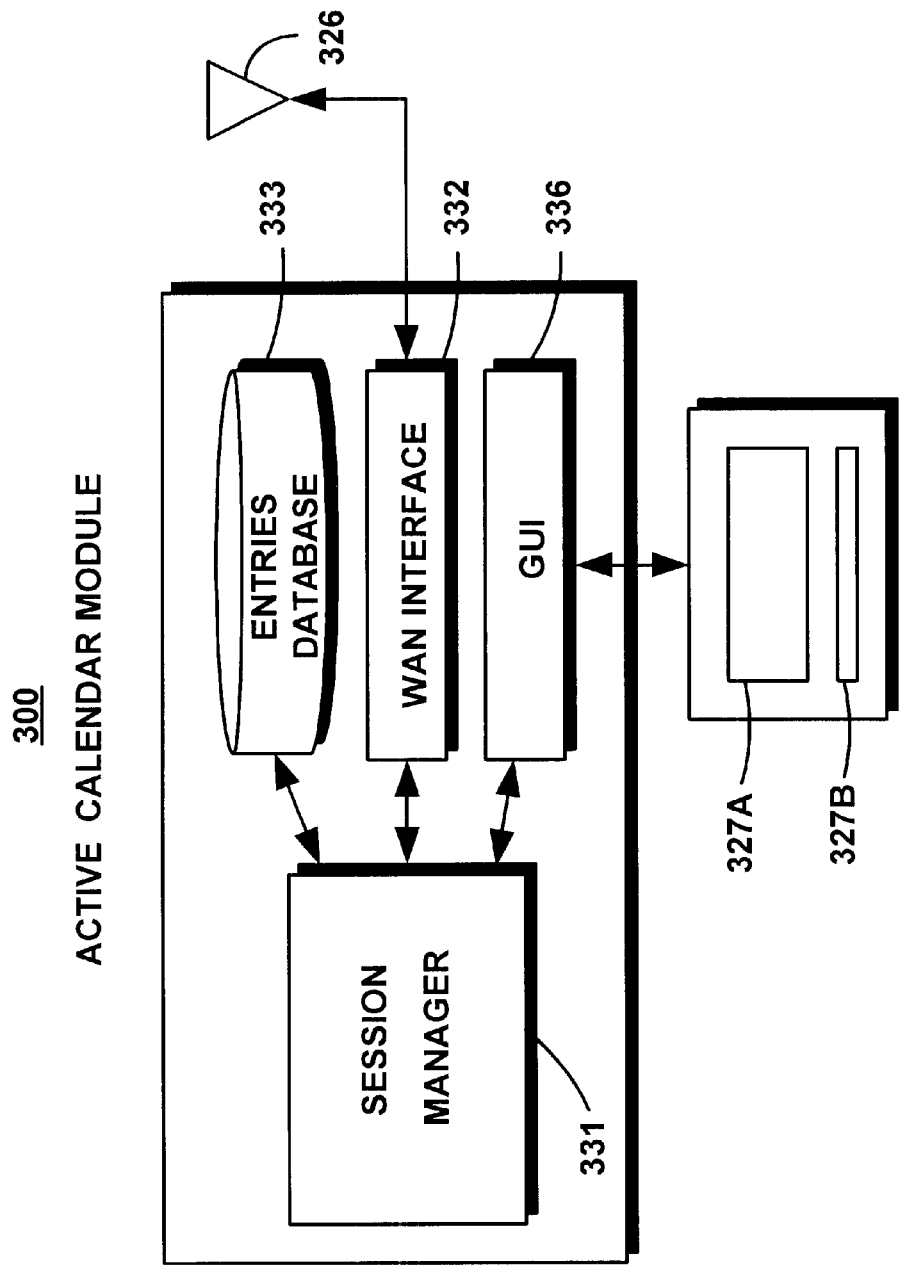
FIG. 4 is a block diagram illustrating the constituent building blocks of an exemplary active calendar that forms part of the system of FIG. 2 or the user mobile computing device of FIG. 3.

The Active Calendar Module 300 (FIGS. 2, 4)

Referring now to FIGS. 2 and 4, the active calendar module 300 can be a web based electronic active calendaring system. The active calendar module 300 can be a separate component or it can be integrated in the user mobile computing device 200. The active calendar module 300 automatically communicates with the event proximity server 400 and/or the destination location server 310, via a WAN transceiver antenna 326, the network 20, and the communications links 232, 234, 236.

The active calendar module 300 includes a session manager 331 which is responsible for the communication and interaction between the internal components of the active calendar module 300. The active calendar module 300 further includes an entries database 333 that contains the user's calendar records. These records include, for example, time, interest, and addresses of the destination locations.

A graphical user interface 336 (GUI) drives a display 337A and accepts user inputs from an input device, such as a data keyboard 337B. The GUI 336 is available for system administrators to configure the system locally, for example, in setting up the calendar entries database 333 and the threshold distances (stored in the threshold distance database 235 in FIG. 2).

The Destination Location Server 310 (FIG. 2)

Referring now to FIG. 2, the destination location server 310 can be a separate component or, alternatively, it can be functionally integrated in event proximity server 400. One of the features of the destination location server 310 is that it executes the tasks, such as purchasing tickets or executing orders. The destination location server 310 generally includes similar components to those of the event proximity server 400 of FIG. 5.

Figure 5:
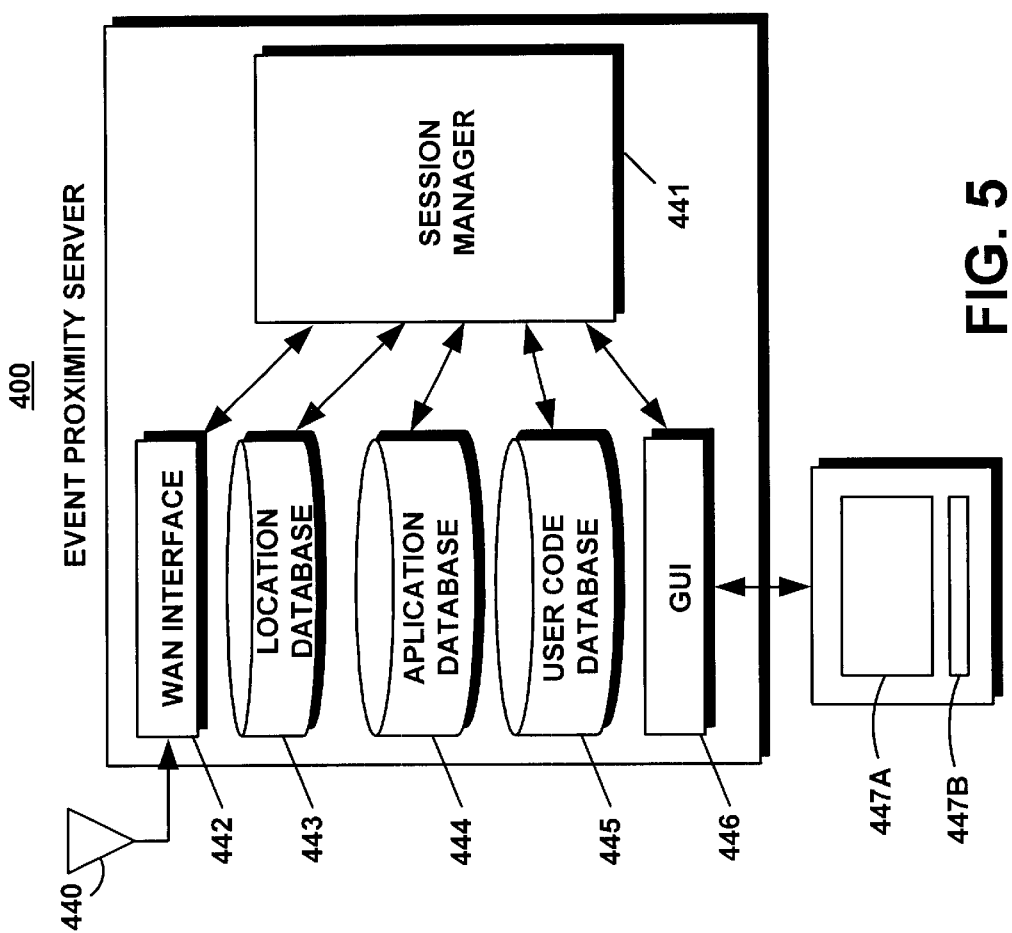
FIG. 5 is a block diagram illustrating the constituent building blocks of an exemplary event proximity server that forms part of the system of FIG. 2.

The Event Proximity Server 400 (FIG. 5)

With reference to FIGS. 2 and 5, the event proximity server 400 may be implemented as a personal computer located and administrated by clients, such as merchants or stores. Its function is to process user requests by execution of a software application 444 or to download user device specific software code 445 to execute on the user mobile computing device 200, depending on the user's profile, entries, and/or location.

The event proximity server 400 is comprised of a WAN interface 442 that communicates with one or more destination location server 310 and/or the user mobile computing device 200, via a WAN transceiver antenna 440, the network 20, and communication links 230, 234, 236. The WAN interface 442 operates under the control of a session manager 441.

The session manager 441 is responsible for the interaction between the sub components of the server 400. It handles incoming requests and the communication with the destination location server 310, and the user mobile computing device 200.

The WAN Interface 442 supports a connection to the network 20 for establishing communication and interaction with the destination location server 310 and the user mobile computing device 200.

The addresses of the destination locations 700 are stored in a location database 443. The records of the location database 443 records are the geographical locations and services offered by the merchants and/or stores. This information is used to identify the locations of the merchants and stores that meet the destination criteria, and to transmit a message informing the user mobile computing device 200 of the store or destination location 700, address, phone number, web homepage, contents, etc.

The application database 444 contains a collection of applications to execute on the event proximity servers 400 based on the user requests, e.g., an application for purchasing tickets, an application for airport check-in, etc.

The user code database 445 contains a collection of executable software codes to download to the user mobile computing device 200. These software codes may include, but are not limited to XML documents, maps/images, audio data, binary software code, etc.

A graphical user interface 446 (GUI) is connected to an I/O device 447A to display and accept user inputs. The GUI interface 446 is used to configure and update the data stored on the server 400, for example, to setup the location database 443, the application database 444, and the user code database 445.

Figure 6:
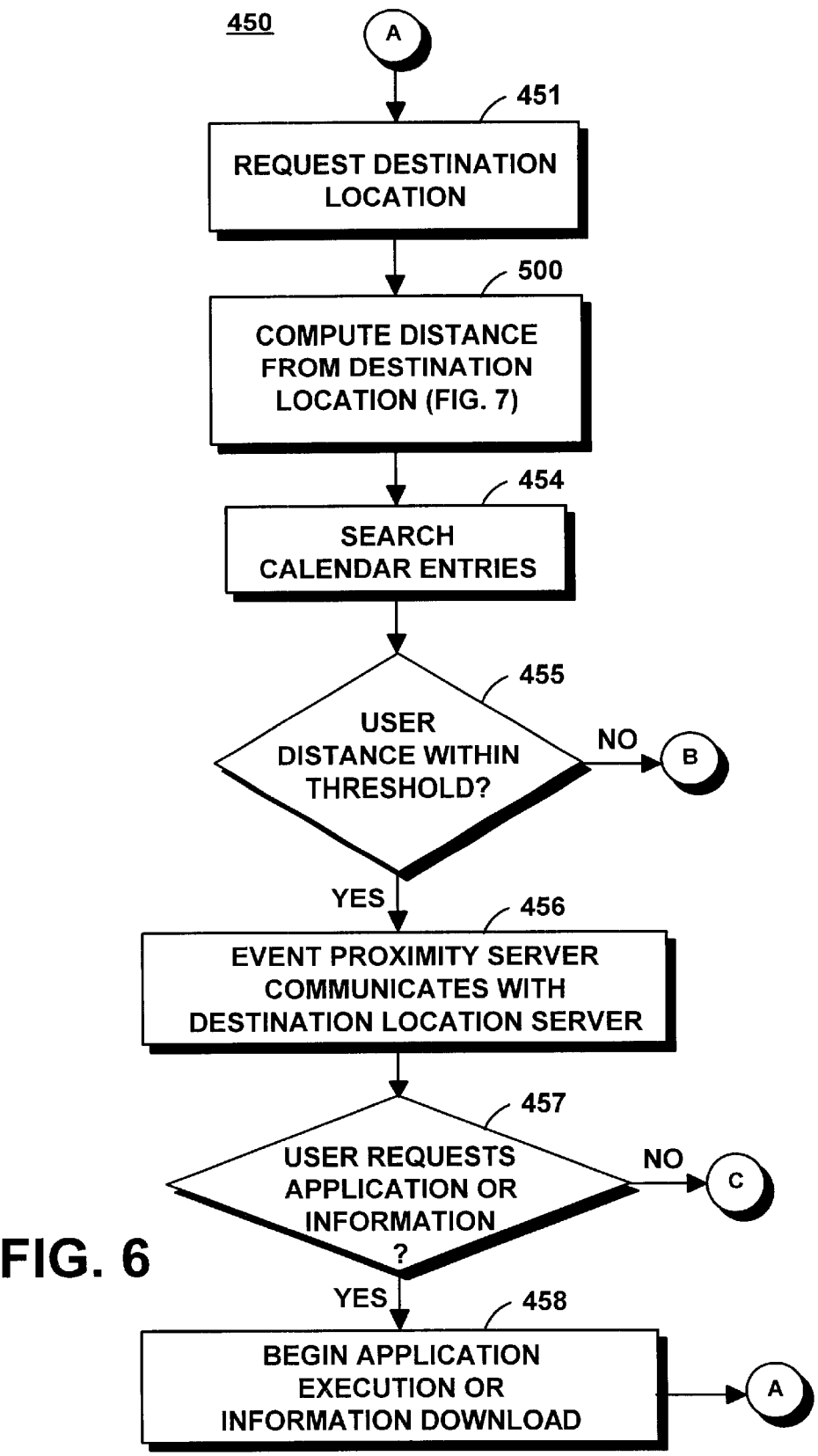
FIG. 6 is a flow chart representing an overall method of operation of the system of FIG. 2.

FIG. 6 illustrates a method of operation 450 of one embodiment of the system 10. The destination location server 310 and/or the event proximity server 400 request the location of the destination location or locations from the locations database 234 (FIG. 3) at step 451. The method 450 calls upon a method 500 for the event proximity server 400 to compute the user distance from a destination location 700 within a predetermined threshold distance stored in the threshold distance database 235 of FIG. 3, as it will be described further in connection with FIG. 7.

The method 450 then proceeds to step 454 wherein the active calendar (300) session manager 331 searches for user calendar entries in the entries database 333, to determine the user's intent, for example visit a museum, watch a movie, fly to Los Angeles, etc. The session manager 441 of the event proximity server 400 (FIG. 5) then compares the distance between the user mobile computing device 200 and a particular destination location 700 (retrieved from the location database 443) within a threshold value (retrieved from the threshold distance database 235). This distance is calculated using data from the GPS-derived location data of the user mobile computing device 200 and the event proximity server 400.

If a match exists between the, calendar entry, the user current location (200), and the destination location 700, the session manager 441 of the event proximity server 400 establishes a connection to a destination location server 310 at step 456, notifying the latter that a user is in proximity to a destination location 700, that is within a desired proximity range (i.e., within a predetermined threshold distance). However, if the calendar entry and the destination location do not match, for example when the user wishes to watch a movie, but he or she is now close to a museum, the session manager 441 ignores this location and proceeds to node B (or step 515) in the method 500 of FIG. 7.

Returning to decision step 457 of FIG. 6, the event proximity server 400 decides, based on the user's calendar entries, what kind of requests to send to the destination location 700, e.g. connect to a purchasing system, connect to the server to receive software code, etc., and whether the user or the user mobile computing device 200 has requested that a specific application from the application database 444 (FIG. 5) be executed on the event proximity server 400, the destination location 700, and/or on the user mobile computing device 200.

If the user has requested the execution of a specific application or the download of information, the session manager 441 of the event proximity server 400 (FIG. 5) processes this request, identifies the application to be executed and executes the same on the event proximity. server 400, the destination location server 310 and/or the user computing device 200, at step 458, preferably with the user interaction and a time stamp when the application execution is completed. For example, in the case of buying a ticket from an online check-in, a time stamp is used to mark that the ticket is bought.

If the user has requested the download of information, the session manager 441 (FIG. 5) processes this request and downloads the requested information and/or instructs the destination location 700 to download the information to the user computing device 200, at step 458.

Figure 8:
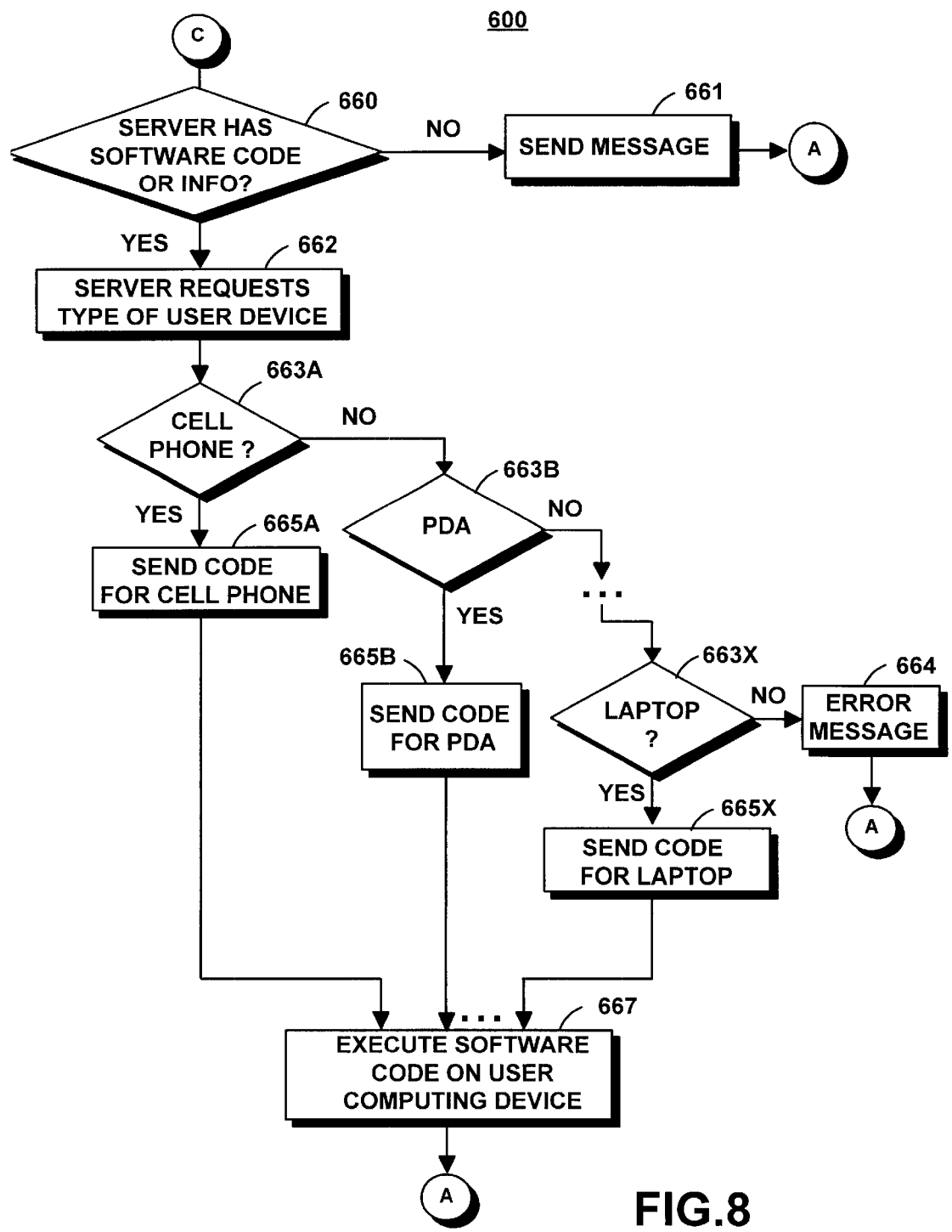
FIG. 8 is a flow chart representing a method of executing an application or software code on the user computing device according to the present invention, for use in the method. of FIG. 6.

If, however, at decision step 457, the method 450 determines that the user has not requested the execution of a specific application or the download of information, even though the user is within a specified range from the destination location 700, such as because the user has already bought the ticket, the method 450 proceeds to node C or step 660 of FIG. 8.

Turning now to FIG. 8, it represents a method 600 of executing an application or software code on, or the download of information to the user computing device 200. At step 660, the method 600 determines if the event proximity server 400 (or alternatively the destination location server 310) possesses the user codes from the user code database 445, and/or the requested information, to download to the user mobile computing device 200. If it does not, the server 400 could send a message to the user mobile computing device 200, such as a simple greeting message ("Welcome to our theater", "Application not available" etc.). The method 600 then returns to node A or step 450 of FIG. 6 and proceeds with the implementation of method 450 as described earlier.

If at step 660 the method 600 determines that the event proximity server 400 possesses the user software codes or the information to download to the destination location server 310 and/or the user computing device 200, the event proximity server 400 (or alternatively the destination location server.310) uses the address received from the user computing device 200 at step 456 (FIG. 6), and requests, at step 662, from the user computing device 200 to identify the type of the user device (which could be the same as, or different from the user computing device 200) to which the server 400 will establish a connection, for example to submit a proposal to purchase the ticket. Depending on the type of this user device, the event proximity server 400 (or alternatively the destination location server 310) uploads device specific software codes (stored in the user code database 445 of FIG. 5) or the requested information to the user computing device 200, at steps 663A through 665X.

For example, if the user device is determined at step 663A to be a mobile telephone, the event proximity server 400 (or alternatively the destination location server 310) uploads the proper software code for the mobile telephone at step 665A. Similarly, if the user device is determined at step 663B to be a personal digital assistant, the event proximity server 400 (or alternatively the destination location server 310) uploads the proper software code for the personal digital assistant at step 665B. If, however, the user device is determined at step 663X to be a laptop computer, the event proximity server 400 (or alternatively the destination location server 310) uploads the proper software code for the laptop computer at step 665X. The user mobile computing device 200 then executes the uploaded software code at step 667, and returns to step 451 (FIG. 6). If method 600 determines at step 663X that the user mobile computing device 200 is not supported by the server 400, the server 400 notes an error message at step 664, terminates the communication with this user mobile computing device 200, and proceeds to node A or step 451 (FIG. 6).

Figure 7:
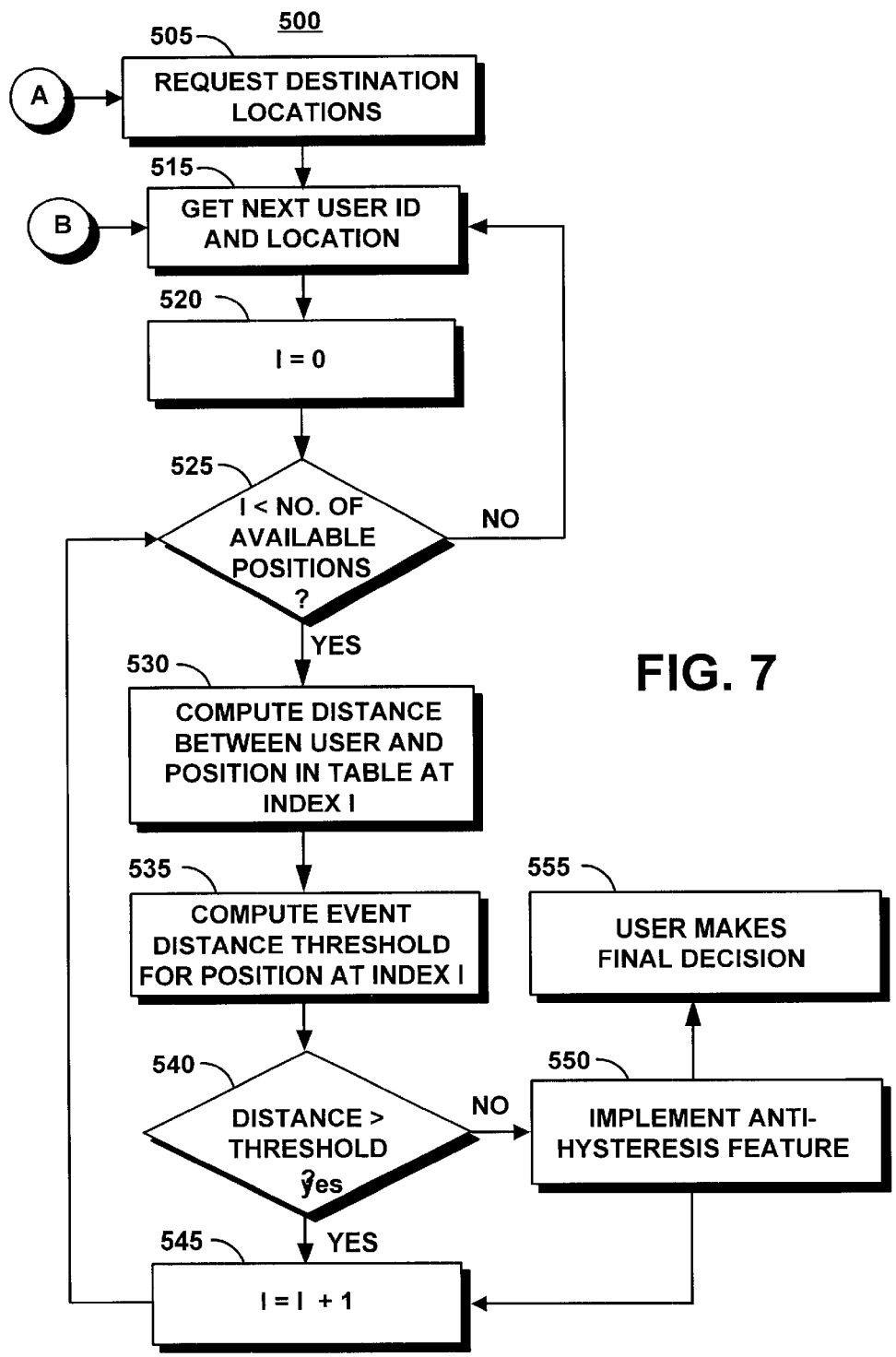
FIG. 7 is a flow chart representing a method of computing the distance between the user and the server according to the present invention, for use in the method of FIG. 6.

Referring now to FIG. 7, it illustrates a method 500 for computing the distance between the user mobile computing device 200 and the destination location 700, for use in conjunction with the method 450 of FIG. 6. The method 500 starts at step 505 by having the event proximity server 400 (or alternatively the destination location server 310) request the destination locations from the locations database 443 (FIG. 5).

The event proximity server 400 (or alternatively the destination location server 310) tracks multiple users by cycling through the users in sequence to determine the next destination of each user (step 515). For example, the server session manager 441 (FIG. 5) requests the user's current location, in for instance latitude/longitude coordinate format, by connecting to the user computing device 200 over the WAN interface 442 (FIG. 5) and WAN interface 243 (FIG. 3). At step 520, the server session manager 441 requests the locations of the destination locations 700 by connecting to the destination locations servers 310 (or by searching the locations database 443). The number of the destination locations is represented as an index counter "I" in FIG. 7, and is set to zero (I=0) at step 520. The server session manager 441 computes the distance between the user and a plurality of significant destination locations.

At decision step 525, the session manager 441 checks whether the total number of destination locations has been exhausted, by determining if the index counter I is less than the total number of available destination locations. If the condition at step 525 is not satisfied, indicating that the index counter I is less than the total number of available destination locations 700, the method 500 returns to step 515 and repeats steps 520 and 525, as described earlier, until the condition at decision step 525 is determined to be satisfied.

If, at decision step 525, the method 500 determines that the index counter I is greater than, or equal to the available number of destination locations 700, it computes the distance between the user computing device 200 and one or more destination locations 700 from GPS data, according to the following mathematical expression (step 530):

$$\text{Distance (kms)}=1.852 * 60*\text{ArcCos}(\text{SIN}(\text{Lat1})* \text{SIN}(\text{Lat2})+\text{COS}(\text{Lat1})* \text{COS}(\text{Lat2})* \text{COS}(\text{Long2}-\text{Long1}))),$$

where:

Lat1 represents the latitude of first position (degrees);

Lat2 represents the latitude of second position (degrees);

Long1 represents the longitude of first position (degrees); and

Long2 represents the longitude of second position (degrees).

Returning to FIG. 7, the method 500 proceeds to step 535 where it extracts the event distance threshold 235 (FIG. 3) from a threshold distance database, at the first server index counter "I=1". Thereafter, the method 500 proceeds to decision step 540 where the server session manager 441 (or alternatively the destination location server 310) compares the distance between the user (or the user computing device 200) and one or more destination locations stored in the location database 443 (FIG. 5). If this-distance exceeds a threshold distance 235 (FIG. 3), the session manager 441 computes the distance between the user and the next destination location 700 by setting the index I equal to I+1 at step 545.

However, if the distance is greater than, or equal to the threshold distance, the method 500 proceeds to decision step 550 and implements an anti-hysteresis feature that prevents the undesirable duplication of transactions. For example, suppose a user drove within the proximity range of a movie theater, and the system 10 automatically purchased a ticket. The user then proceeds to park his or her vehicle in a parking lot outside the proximity range, and then walks toward the movie theater, thus re-entering the proximity range. It would be desirable to prevent the system 10 from purchasing another ticket for the user.

To this end, one approach is to instruct the system 10 not to automatically duplicate a previous transaction that was executed within a predetermined period of time and/or within a predetermined distance for the destination location.

Another approach is to expand the proximity range once the transaction has been executed. So, in the above example, suppose the original proximity range is 1 km, once the ticket is purchased, the system 10 expands the proximity range to, for example, 2 km from the destination location (i.e., the movie theater), to accommodate some flexibility in the user's movement.

Figure 9:
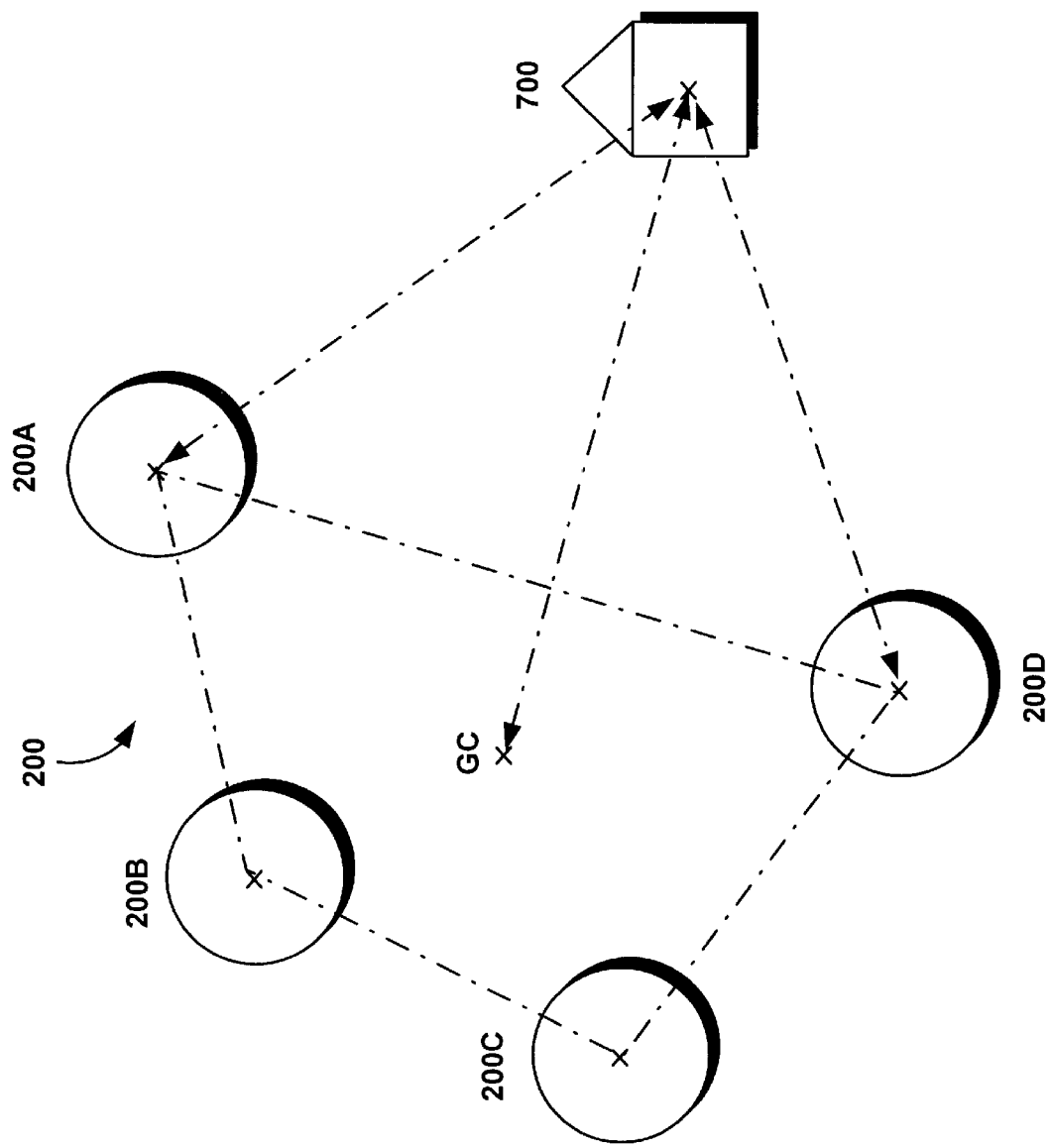
FIG. 9 illustrates the use of the system of FIG. 2 by a group of users.

While the present system 10 and associated method 450 have been described in relation to a single user or user-mobile computing device 200, it should be clear that the system 10 and method 450 can also be used to provide the desired service to a group of users (FIG. 9) that are collectively referenced by the number 200. In the situation of a group of users wishing to meet at a destination location 700, each of the users is provided with his or her own user mobile computing device 200A, 200B, 200C, 200D, etc. that interact with the event proximity 400 as described earlier in connection with user mobile computing device 200. However, in the example of a group attendance, the event proximity sever 400 triggers of initiates the desired application or business transaction, once all the group members 200A, 200B, 200C, 200D are within a desired proximity threshold.

The proximity of the group members can be defined in numerous way, some of which are enumerated below:

1. The proximity is the distance between one destination location 700 and all the group members.
2. The proximity is the distance between one destination location 700 and the majority of the group members.
3. The proximity is the distance between one destination location 700 and a dynamic geometric center (GC) formed by interpolating the positions of all or the majority of the group members.
4. The proximity is the distance between one destination location 700 and a group leader, i.e., 200D.

Concurrently with, or sequentially relative to step 550, the method 500 proceeds to step 555 wherein the event proximity server 400 or alternatively the destination location server 310 proposes a quote or a completion of the event schedule to the user computing device 200, allowing the user to make the final decision as to whether or not to have the destination location server 310 (or alternatively the event proximity server 400) execute the desired transaction. The user can accept or decline the transaction.

It is to be understood that the specific embodiments of the invention that have been described are merely illustrative of certain application of the principle of the present invention. Numerous modifications may be made to the system and associated method described herein without departing from the spirit and scope of the present invention. For example, while the communication between the components of the system 10 has been described in terms of-a GPS system, it should be understood that other systems coul[0084] alternatively be used. One such communication and identification system is described in a co-pending U.S. application titled "System and Method for Providing Time-limited Access to People, Objects and Services", Ser. No. 09/672, 360, which was filed on Sep. 28, 2000 and assigned to the same assignee as the present invention, and which is incorporated herein by reference in its entirety.

What is claimed is:

1. A method of implementing a proximity driven activity, comprising:
   specifying an activity to be executed at an indeterminate destination location;
   storing an executable software code corresponding to the activity;
   determining a current location of a mobile computing device;
   determining whether the destination location is within a predefined proximity range from the current location of the mobile computing device;
   executing the executable software code at a time when the destination location is within the proximity range of the mobile computing device; and
   transmitting an address of the destination location to the mobile computing device.

2. The method according to claim 1, further including transmitting the current location of the mobile computing device to an event proximity server.

3. The method according to claim 2, wherein transmitting the current location includes transmitting over a network.

4. The method according to claim 3, wherein transmitting over the network includes transmitting over the Internet.

5. The method according to claim 2, further including downloading a software code from the server to the mobile computing device.

6. The method according to claim 5, further including executing the software code on the mobile computing device.

7. The method according to claim 2, wherein the step of executing includes executing the executable software code on the server.

8. The method according to claim 7, wherein the step of executing includes executing an anti-hysteresis software code to prevent duplication of the activity.

9. The method according to claim 8, wherein executing the anti-hysteresis software code includes setting an expanded proximity margin.

10. The method according to claim 9, further including determining current locations of a plurality of related mobile computing devices; and
    wherein the step of determining whether the destination location is within a predefined proximity range includes determining if the destination location is within a predefined proximity range from at least some of the mobile computing devices.

11. The method according to claim 1, wherein determining a current location of a mobile computing device includes using a GPS coordinate frame.

12. A system for implementing a proximity driven activity, comprising:
    a calendar module for specifying an activity to be executed at an indeterminate destination location;
    a server for storing an executable software code corresponding to the activity and for determining a current location of a mobile computing device; and
    the server determining whether the destination location is within a predefined proximity range from the current location of the mobile computing device, and, when the server determines that the destination location is within the proximity range of the mobile computing device, the server executes the executable software code, and transmits an address of the destination location to the mobile computing device.

13. The system according to claim 12, wherein the server calculates the current location of the mobile computing device.

14. The system according to claim 13, wherein the mobile computing device and the server communicate over a network.

15. The system according to claim 14, wherein the mobile computing device and the server communicate over the Internet.

16. The system according to claim 13, wherein the server downloads a software code to the mobile computing device.

17. The system according to claim 16, wherein the mobile computing device executes the software code.

18. The system according to claim 13, wherein the server executes an anti-hysteresis software code to prevent duplication of the activity.

19. The system according to claim 18, wherein the server executes the anti-hysteresis software code by setting an expanded proximity margin.

20. The system according to claim, 19, wherein the server determines current locations of a plurality of related mobile computing devices, and determines if the destination location is within a predefined proximity range from at least some of the mobile computing devices.

21. The system according to claim 20, wherein the plurality of mobile computing devices includes any one or more of: a personal computer, a personal digital assistant, or a cellular telephone.

22. The system according to claim 12, wherein the proximity range is any one, or more of:
- a distance between a destination location and group members;
- a distance between a destination location and a majority of the group members: or
- a distance between a destination location and a dynamic geometric center (GC) formed by interpolating the positions of all or the majority of the group members.

23. A computer program product for implementing a proximity driven activity, comprising:
- a calendar module for specifying an activity to be executed at an indeterminate destination location;
- a server for storing an executable software code corresponding to the activity and for determining a current location of a mobile computing device; and
- the server determining whether the destination location is within a predefined proximity range from the current location of the mobile computing device, and, when the server determines that the destination location is within the proximity range of the mobile computing device, the server executes the executable software code, and transmits an address of the destination location to the mobile computing device.

24. The computer program product according to claim 23, wherein the server calculates the current location of the mobile computing device.

25. The computer program product according to claim 24, wherein the mobile computing device and the server communicate over a network.

26. The computer program product according to claim 25, wherein the mobile computing device and the server communicate over the Internet.

27. The computer program product according to claim 24, wherein the server downloads a software code to the mobile computing device.

28. The computer program product according to claim 27, wherein the mobile computing device executes the software code.

29. The computer program product according to claim 24, wherein the server executes an anti-hysteresis software code to prevent duplication of the activity.

30. The computer program product according to claim 29, wherein the server executes the anti-hysteresis software code by setting an expanded proximity margin.

31. The computer program product according to claim 30, wherein the server determines current locations of a plurality of related mobile computing devices, and determines if the destination location is within a predefined proximity range from at least some of the mobile computing devices.

32. The computer program product according to claim 31, wherein the plurality of mobile computing devices includes any one or more of: a personal computer, a personal digital assistant, or a cellular telephone.

33. The computer program product according to claim 23, wherein the proximity range is any one or more of:
- a distance between a destination location and group members;
- a distance between a destination location and a majority of the group members; or
- a distance between a destination location and dynamic geometric center (GC) formed by interpolating the positions of all or the majority of the group members.

* * * * *